May 17, 1949.  A. J. LEVIN  2,470,312
RECIPROCAL BUOYANCY LIFT

Filed March 22, 1948　　　　　　　　　　　　2 Sheets-Sheet 1

INVENTOR.
ABRAHAM J. LEVIN.
BY
Robert A. Sloman
ATTORNEY.

Patented May 17, 1949

2,470,312

UNITED STATES PATENT OFFICE 2,470,312

RECIPROCAL BUOYANCY LIFT

Abraham J. Levin, Franklin, Mich.

Application March 22, 1948, Serial No. 16,305

8 Claims. (Cl. 253—1)

This invention relates to a means for producing a mechanical movement, and more particularly to fluid mechanisms for producing multiple movements.

The principal object of this invention is to provide structures adapted to utilize the reserve buoyancy of objects partially or wholly immersed within a fluid, or on the other hand to utilize an artificially created reserve buoyancy.

It is the further object of this invention to provide a means for regulating and increasing such reserve buoyancy artificially whereby the latter may be employed to do useful work as in the transmission or transportation of fluids from one point to another, or on the other hand for effecting relative movements of one element relative to another, or other hydrodynamic purposes.

It is the further object of this invention to provide a means for creating or increasing the reserve buoyancy of a fluid container to thereby elevate the same relative to a source of fluid artificially creating a fluid pressure head which is available for any number of purposes, as for instance in attaining the relative movements of a pair of objects immersed or partially immersed in fluids, or other hydrodynamic purposes.

These and many other objects will be seen from the following specification and claims in conjunction with appended drawings in which:

Figure 1:
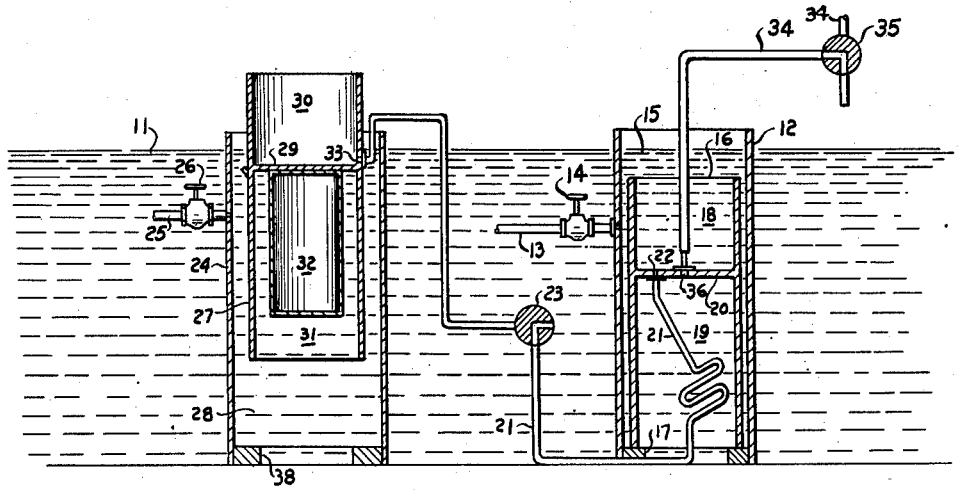
Fig. 1 is a partially diagrammatic elevational section illustrating the apparatus embodying said invention.

It will be understood that the above drawings illustrate merely a preferable embodiment of the invention by way of illustration only, and that other embodiments are contemplated within the scope of the claims hereafter set out.

Referring to the drawings a body of fluid 11 such as water is shown within which is submerged substantially the upright hollow cylindrical container or housing 12 which is preferably open at its opposite ends.

Fluid inlet pipe 13 with hand valve 14 is joined to housing 12 below the water level for communication with the interior thereof, whereby with said valve open the fluid 15 within housing 12 will assume the level of fluid 11 on the exterior thereof.

A second substantially hollow housing 16 preferably open ended is coaxially and loosely positioned within housing 12, being submerged therein as shown in Fig. 1, with its lower edge bearing upon the annular flange 17 which projects inwardly from the lower end of housing 12.

Housing 16 is provided with compartments 18 and 19 by means of the intermediate partition 20 therein so that compartment 18 has substantially one half the volume of compartment 19, for illustration.

Housing 16 which is adapted for vertical reciprocal movement within housing 12 has joined thereto the flexible conduit 21 whose inner end is suitably joined to the partition 20 in registry with opening 22 therethrough, providing fluid communication at the lower end of and within compartment 18 which forms the upper part of reciprocally moveable housing 16.

The other end of conduit 21 extends loosely thru the lower open end of compartment 19, and thru a corresponding opening in the outer housing 12 for a juncture with the hand valve 23.

A second hollow upright preferably cylindrical housing 24 is substantially immersed within fluid 11 in spaced relation to housing 12, the interior of housing 24 being adapted for communication with fluid 11 by means of outlet pipe 25 with hand valve 26 therein.

A second hollow open-ended partitioned housing 27 is moveably positioned within housing 24 normally floating within the liquid 28 therein. Said housing has a partition 29 defining upper and lower compartments 30 and 31 respectively.

An air-tight hollow bulkhead 32 depends from partition 29, being enclosed within compartment 31, whereby partitioned housing 27 has an initial reserve buoyancy causing the same to float within liquid 28 with the upper portion thereof projecting above said liquid.

Fluid supply pipe 21 from upper chamber 18 extends thru hand valve 23 with its other end joined in communicating relation with the interior of compartment 30 at its lower end at opening 33.

A second flexible conduit 34 with two-way valve 35 is joined at its outer end to a source of compressed air or other gaseous substance, while its other end is joined to partition 20 within housing 16 in registry with opening 36 therethrough, providing communication to the interior of lower chamber 19, which forms a part of housing 16.

Operation

The operation of the above described mechanism is respectively shown in Figs. 1, 2, 3, and 4 of the drawings, illustrating various relative positions of housings 16 and 27 under varying conditions.

In Fig. 1 valves 14 and 26 are normally open providing fluid communication between the body of fluid 11 and the interiors of the respective housings 12 and 24, whereby the fluid therein is at the same level as the fluid 11.

As viewed in Fig. 1 compartments 18 and 19 are completely immersed within the fluid 15 in housing 12, with the lower end of housing 16 bearing upon flange 17 at the base of housing 12. At the same time housing 27 is floating with its upper compartment 30 completely empty.

Figure 2:
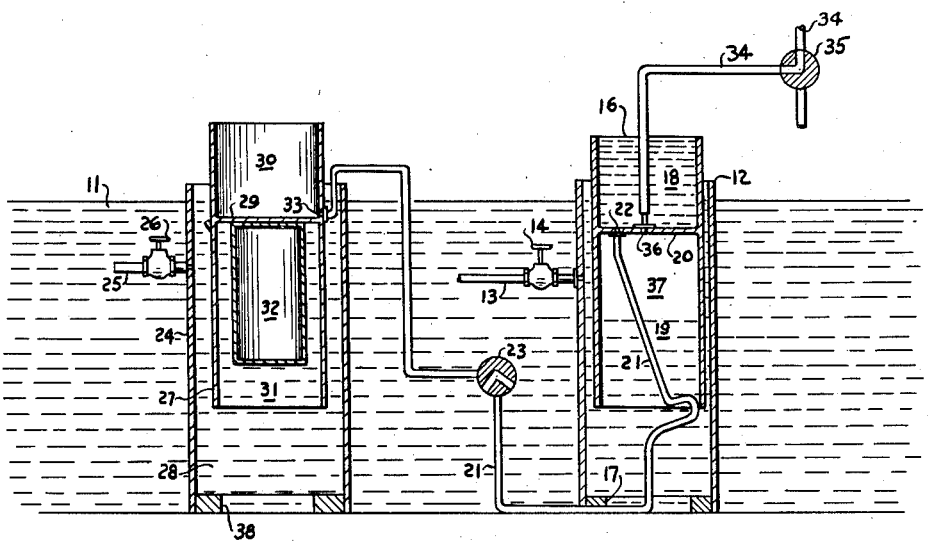
Fig. 2 is a similar view illustrating the relative positions of the elements of the apparatus under a change of conditions.

As viewed in Fig. 2 valve 35 has been opened long enough to permit the introduction of compressed air or other gaseous substance into the upper portion of chamber 19 to provide the cylindrical column of compressed air 37.

This column of air is entrapped within chamber 19 and thereby creates a reserve buoyancy in housing 16 which previously did not exist as in the illustration of Fig. 1, but which now causes housing 16 to rise vertically within the fluid 15 in housing 12, so that the fluid filled upper chamber 18 is elevated above the surface of fluid 11 establishing a head of fluid therein.

Figure 3:
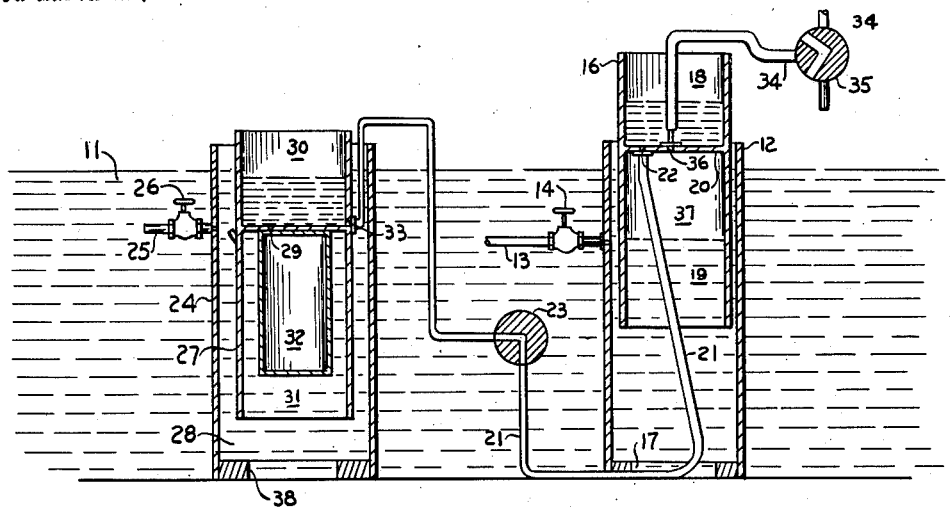
Fig. 3 is a similar view illustrating the relative positions of the elements of the apparatus under a further change of conditions.

With valve 23 adjusted fluid will flow thru conduit 21 seeking its level in upper compartment 30 which as illustrated in Fig. 3 has begun to fill with the fluid from upper chamber 18.

As viewed in Fig. 3 as said fluid drains from chamber 18 and into compartment 30, the combined weight of fluid in chamber 18 and its housing 16 has been reduced whereby said reserve buoyancy in housing 16 has been increased. In other words the buoyant effect of the column of air 37 has increased due to the reduction of weight of housing 16.

Consequently as viewed in Fig. 3 housing 16 and its chamber 18 have moved upwardly in the fluid 15 from the position shown in Fig. 2 to thereby increase the head of the remaining fluid within chamber 18 and assuring the continued flow thru conduit 21 and into upper compartment 30 of housing 27.

Figure 4:
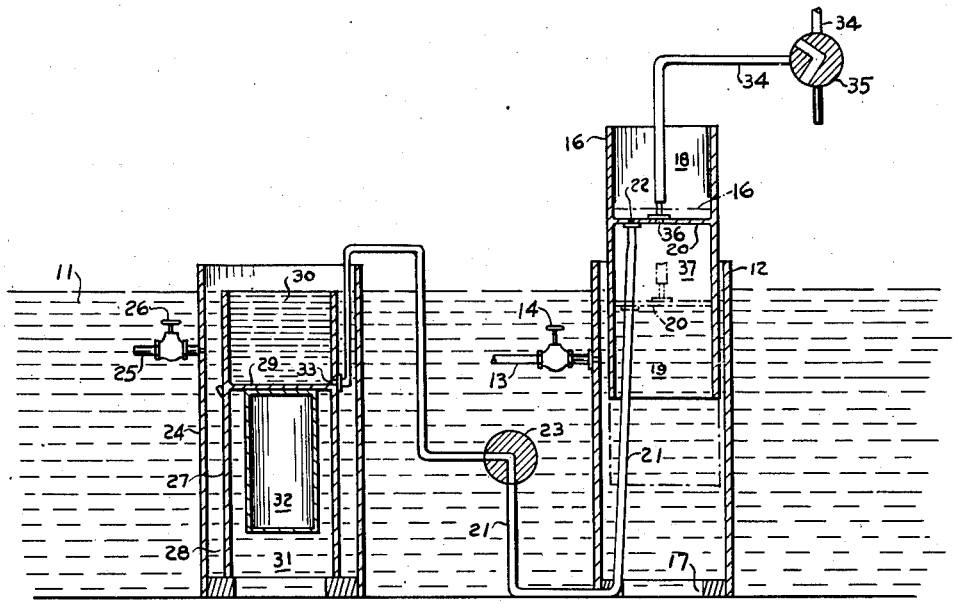
Fig. 4 is a similar view illustrating the relative positions of the elements under a still further change of conditions.

The addition of fluid within compartment 30 has in effect reduced the initial reserve buoyancy of housing 27 so that the same has now dropped in the fluid 28 from the position shown in Fig. 2, and will continue to drop until completely submerged as in Fig. 4 by the time all the fluid has drained from chamber 18 of housing 16, or by the time chamber 30 is filled.

In its lowest position the lower end of housing 27 is resting upon the annular flange 38 which normally forms a part of or is secured to the inner lower portion of housing 24.

At the same time the reserve buoyancy of housing 16 is at its maximum with all fluid drained from chamber 18, so that housing 16 is now floating at its highest point within the liquid 15 in housing 12, said column of air 37 having remained constant, being interposed between partition 20 and the fluid within chamber 19.

To complete the cycle of operation hand valve 35 which is preferably a 2-way valve, is so constructed that upon adjustment thereof compressed air 37 may be permitted to escape from chamber 19, thereby completely eliminating the reserve buoyancy of said housing. Consequently the latter will descend within fluid 15 to the fragmentary dotted line indication of partition 20 as viewed in Fig. 4.

It will be noted that the position of partition 20 as well as the inlet opening which joins conduit 21, is below the level of fluid within submerged compartment 30, with the result that fluid will flow from compartment 30 thru conduit 21 back into the lower portion of chamber 18.

As chamber 18 begins to fill the weight of the fluid therein combined with the weight of housing 16, causes the latter to slowly descend down into fluid 15 within housing 12.

At the same time an equal amount of fluid is withdrawn from compartment 30, and in view of the reserve buoyancy of housing 27 due to bulkhead 32, said housing 27 will begin to rise in the fluid 28, in view of its decrease in weight.

Eventually all of the fluid from compartment 30 will drain back into chamber 18 inasmuch as housing 16 is moving downwardly at the same time as housing 27 is moving upwardly, thereby maintaining a differential or fluid pressure head in compartment 30 relative to chamber 18.

When the cycle is completed the apparatus will again assume substantially the position shown in Fig. 1, with housing 16 now completely submerged, and with housing 27 floating in fluid 28 within housing 24, and with compartment 30 completely drained.

In connection with Fig. 4 it was explained that valve 35 is adapted to permit the escape of air 37 thru pipe 34. It may not be necessary to permit escape of all the air 30, but just a sufficient amount as will permit the fall of container 16, with the remaining shortened column of air 30 being partially compressed.

It is contemplated that the compressed air which is permitted to escape may be utilized, if desired, for a useful purpose.

Drain pipe 21 is shown as the preferred means of delivering fluid from chamber 18 to compartment 30; however it is contemplated that said fluid may be siphoned therefrom if desired, for delivery to chamber 30.

As above described in the preferred embodiment of the invention a source of compressed air is employed to create the reserve buoyancy specified. It is contemplated however that other means may also be employed for creating this reserve buoyancy, as for instance a weight and pulley, a lever, or other mechanical means, to so upset the initial equilibrium of fluid as to cause container 18 with a quantity of fluid to be elevated above the normal level of fluid 11, creating a head of fluid.

The above description of element 16 refers to members 18 and 19 as compartments. The claims set out however specify upper compartment 18 as an upper chamber, and with compartment 19 being specified as a lower chamber.

Figs. 1 thru 4 illustrate the compartments 30 and 31 as forming parts of hollow open-ended partitioned housing 27, the lower compartment being designated as member 31.

It is contemplated that the operation of the device will be substantially the same with the elimination of the lower cylindrical portion 31, and with element 27 merely defined as a floating element having a fluid compartment 30.

In the preferred embodiment of the invention the lower portion 31 of element 27 acts substantially as a guide therefor or a ballast tending to maintain element 27 in an upright position.

While said reserve buoyancy may be created by the operation of a weight and pulley, a lever, or other mechanical means, as above referred to, it follows further that the release of said weight and pulley, lever, or other mechanical means would correspond to the release of air from chamber 19 to thereby decrease said reserve buoyancy.

Having described my invention reference should now be had to the claims which follow for determining the scope thereof.

I claim:

1. In combination, an open-ended upright partitioned housing immersed in a fluid body and having upper and lower chambers, a compressed air supply conduit in communication with the lower chamber, a second upright housing floating in said fluid and having a fluid compartment, an airtight bulkhead carried thereby creating a reserve buoyancy for said second housing, valve means in said conduit for controlling the flow of air to said lower chamber entrapping a column of air therein to develop a reserve buoyancy in said first housing causing said upper chamber to rise above said compartment creating a head of fluid in said upper chamber relative to said compartment, a fluid conduit interconnecting said upper chamber and compartment and valve means in said conduit alternately connectable with said compartment and with said fluid body.

2. In combination, an open-ended upright partitioned housing immersed in a fluid body and having upper and lower chambers, a compressed air supply conduit in communication with the lower chamber, a second upright housing floating in said fluid and having a fluid compartment, valve means in said air conduit for controlling the flow of air to said lower chamber entrapping a column of air therein to develop a reserve buoyancy in said first housing causing said upper chamber to rise above said compartment creating a head of fluid in said upper chamber relative to said compartment, a fluid conduit interconnecting said upper chamber and compartment and valve means in this conduit alternately connectable with said compartment and with said fluid body.

3. In combination, an open-ended upright partitioned housing immersed in a fluid body and having upper and lower chambers, a compressed air supply conduit in communication with the lower chamber, a second upright housing floating in said fluid and having a fluid compartment, valve means in said air conduit for controlling the flow of air to said lower chamber entrapping a column of air therein to develop a reserve buoyancy in said first housing causing said upper chamber to rise above said compartment creating a head of fluid in said upper chamber relative to said compartment, a fluid conduit interconnecting said upper chamber and compartment, and a two way valve in said latter fluid conduit controlling the flow of fluid between said upper chamber and compartment, and adapted to alternately establish communication between said upper chamber and said fluid body.

4. In combination, an open-ended upright partitioned housing immersed in a fluid body and having upper and lower chambers, a compressed air supply conduit in communication with the lower chamber, a second upright housing floating in said fluid and having a fluid compartment, valve means in said air conduit for controlling the flow of air to said lower chamber entrapping a column of air therein to develop a reserve buoyancy in said first housing causing said upper chamber to rise above said compartment creating a head of fluid in said upper chamber relative to said compartment, a fluid conduit interconnecting said upper chamber and compartment, and valve means in said latter fluid conduit controlling the flow of fluid between said upper chamber and compartment and adapted to alternately establish communication between said upper chamber and said fluid body, the reserve buoyancy in said first housing increasing as fluid flows from its upper chamber into said compartment, permitting a continued upward movement of said first housing maintaining a relative head between said upper chamber and compartment.

5. In combination, an open-ended upright partitioned housing immersed in a fluid body and having upper and lower chambers, a compressed air supply conduit in communication with the lower chamber, a second upright housing floating in said fluid and having a fluid compartment, valve means in said air conduit for controlling the flow of air therein to develop a reserve buoyancy in said first housing causing said upper chamber to rise above said compartment creating a head of fluid in said upper chamber relative to said compartment, a fluid conduit interconnecting said upper chamber and compartment, and valve means in said latter fluid conduit controlling the flow of fluid between said upper chamber and compartment and adapted to alternately establish fluid communication between said upper chamber and said fluid body, the reserve buoyancy in said first housing increasing as fluid flows from its upper chamber into said compartment, permitting a continued upward movement of said housing maintaining a relative head between said upper chamber and compartment, the reserve buoyancy of said second housing decreasing as its upper compartment fills, causing the same to be gradually immersed in said fluid, thereby maintaining a continued relative pressure head between said upper chamber and said compartment.

6. In combination, an open-ended upright partitioned housing immersed in a fluid body and having upper and lower chambers, a compressed air supply conduit in communication with the lower chamber, a second upright housing floating in said fluid and having a fluid compartment, valve means in said air conduit for controlling the flow of air to said lower chamber entrapping a column of air therein to develop a reserve buoyancy in said first housing causing said upper chamber to rise above said compartment creating a head of fluid in said upper chamber relative to said compartment, a fluid conduit interconnecting said upper chamber and compartment, and valve means in said latter fluid conduit controlling the flow of fluid between said upper chamber and compartment and adapted to alternately establish fluid communication between said upper chamber and said fluid body, the reserve buoyancy in said first housing increasing as fluid flows from its upper chamber into said compartment, permitting a continued upward movement of said first housing maintaining a relative head between said upper chamber and compartment, the reserve buoyancy of said second housing decreasing as its compartment fills, causing the same to be gradually immersed in said fluid, thereby maintaining a continued relative head between said supply chamber and compartment, the valve means in said air conduit being adjustable to permit the escape of compressed air from said lower chamber, decreasing the reserve buoyancy of said first housing so that it descends into the fluid with its upper chamber below the level of fluid in said compartment.

7. In combination, an object having a reserve buoyancy and floating in a body of fluid, a fluid container carried thereby, an element immersed in said body of fluid in spaced relation to said object, a fluid receptacle carried thereby, means cooperable with said element and receptacle to elevate the same and its fluid above the surrounding fluid level to create a reserve buoyancy in said element and a head relative to said container, a fluid conduit between said container and receptacle for conducting fluid from said receptacle increasing the reserve buoyancy of said element and to said container reducing the reserve buoyancy of said object, and valve means in said conduit controlling the flow of fluid between said receptacle and container and adapted to alternately establish fluid communication between said receptacle and body of fluid.

8. In combination, an object having a reserve buoyancy and floating in a body of fluid, a fluid container carried thereby, an element immersed in said body of fluid in spaced relation to said object, a fluid receptacle carried thereby, means cooperable with said element and receptacle to elevate the same and its fluid, above the surrounding fluid level to create a reserve buoyancy in said element and a head relative to said container, a fluid conduit between said container and receptacle for conducting fluid from said receptacle increasing the reserve buoyancy of said element and to said container reducing the reserve buoyancy of said object, said means being adapted to permit lowering of said receptacle below said container for decreasing the reserve buoyancy of said element, the reserve buoyancy of said object increasing as fluid flows from said container to said receptacle, and valve means in said conduit controlling the flow of fluid between said receptacle and container and adapted to alternately establish fluid communication between said receptacle and body of fluid.

ABRAHAM J. LEVIN.

No references cited.